US010761207B2

(12) United States Patent
Wang (10) Patent No.: US 10,761,207 B2
(45) Date of Patent: Sep. 1, 2020

(54) AUTOMATIC UPLINK WEATHER INFORMATION SHARING

(71) Applicant: Honeywell International Inc., Morris Plains, NJ (US)

(72) Inventor: Haiming Wang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 758 days.

(21) Appl. No.: 15/382,067

(22) Filed: Dec. 16, 2016

(65) Prior Publication Data

US 2018/0172800 A1    Jun. 21, 2018

(51) Int. Cl.
*G01S 13/95*    (2006.01)
*G08G 5/00*    (2006.01)
(Continued)

(52) U.S. Cl.
CPC ............ *G01S 13/951* (2013.01); *G01S 7/003* (2013.01); *G01S 13/953* (2013.01); *G01W 1/00* (2013.01);
(Continued)

(58) Field of Classification Search
CPC .. G08G 5/0091; G08G 5/0013; G08G 5/0026; G01S 13/95–958; G01S 7/003;
(Continued)

(56) References Cited

U.S. PATENT DOCUMENTS 5,265,024 A * 11/1993 Crabill ................. G05D 1/0055
342/26 A
6,043,756 A    3/2000 Bateman et al.
(Continued)

FOREIGN PATENT DOCUMENTS

EP    2 290 636 A1    3/2011

OTHER PUBLICATIONS

"Central Ground-Based Processing Station (CGBS)", "Retrieved Apr. 20, 2016 from http://www.safelander.com/groundstation.htm", pp. 1-2.
(Continued)

*Primary Examiner* — Matthew M Barker
(74) *Attorney, Agent, or Firm* — Bookoff McAndrews, PLLC (57) ABSTRACT

Systems and methods for automatic uplink of weather information are provided. In one embodiment, a ground-based system for automatically communicating crowd-sourced weather information comprises: at least one transceiver configured to communicate with vehicles via one or more communication links; a weather data processing system coupled to the at least one transceiver, the weather data processing system comprising at least one processor coupled to a memory, the at least one processor configured to: receive weather information from the vehicles; aggregate the weather information received from the vehicles and store aggregated weather information in the memory; automatically transmit aggregated weather information to a first vehicle of the vehicles via the one or more communication links in response to the weather data processing system receiving a radar error report from the first vehicle.

13 Claims, 6 Drawing Sheets

(51) Int. Cl.
  *G01S 7/00* (2006.01)
  *G01W 1/00* (2006.01)
(52) U.S. Cl.
  CPC ......... *G08G 5/0013* (2013.01); *G08G 5/0026* (2013.01); *G08G 5/0091* (2013.01); *G01W 2001/006* (2013.01); *Y02A 90/18* (2018.01)
(58) Field of Classification Search
  CPC ... G01W 1/00; G01W 2001/006; Y02A 90/18
  See application file for complete search history.

(56) References Cited

U.S. PATENT DOCUMENTS

| | | | | |
|---|---|---|---|---|
| 6,501,392 | B2* | 12/2002 | Gremmert | G01S 7/003 340/971 |
| 6,828,922 | B1 | 12/2004 | Gremmert et al. | |
| 6,977,608 | B1* | 12/2005 | Anderson | G01C 21/16 340/945 |
| 7,039,505 | B1 | 5/2006 | Southard et al. | |
| 7,069,147 | B2* | 6/2006 | Manfred | G01W 1/08 340/971 |
| 7,099,752 | B1 | 8/2006 | Lenell et al. | |
| 7,633,428 | B1* | 12/2009 | McCusker | G01S 7/003 342/26 B |
| 7,668,656 | B2* | 2/2010 | Southard | G01S 7/003 701/300 |
| 8,022,859 | B2* | 9/2011 | Bunch | G01S 13/953 342/26 R |
| 8,054,214 | B2* | 11/2011 | Bunch | G01S 7/003 342/26 R |
| 8,217,828 | B2* | 7/2012 | Kirk | G01W 1/08 342/26 R |
| 8,265,806 | B2* | 9/2012 | Coulmeau | G01C 23/00 340/601 |
| 8,314,730 | B1* | 11/2012 | Musiak | G01S 7/003 342/25 B |
| 8,604,963 | B1* | 12/2013 | Kronfeld | G01S 13/95 342/26 B |
| 9,223,020 | B1 | 12/2015 | Crosmer et al. | |
| 9,310,477 | B1* | 4/2016 | Sampigethaya | G01S 13/91 |
| 9,535,158 | B1* | 1/2017 | Breiholz | G01S 13/953 |
| 10,151,834 | B2* | 12/2018 | Wang | G01S 13/953 |
| 10,247,557 | B2* | 4/2019 | Chintakindi | G01C 21/26 |
| 10,365,365 | B2* | 7/2019 | Christianson | G01S 7/003 |
| 2007/0073485 | A1 | 3/2007 | Manfred et al. | |
| 2011/0054776 | A1 | 3/2011 | Petrov et al. | |
| 2011/0074624 | A1 | 3/2011 | Bunch | |
| 2014/0358441 | A1 | 12/2014 | Hale et al. | |
| 2015/0304813 | A1 | 10/2015 | Esposito et al. | |
| 2016/0019798 | A1* | 1/2016 | Agrawal | B64D 45/00 701/14 |
| 2018/0096532 | A1* | 4/2018 | Srivastav | G06T 19/006 |

OTHER PUBLICATIONS

Extended European Search Report dated May 7, 2018 in European Application No. 17200859.1 (10 pages).

\* cited by examiner

AUTOMATIC UPLINK WEATHER INFORMATION SHARING

BACKGROUND

For pilots of commercial and other aircraft, knowledge of weather data, in particular knowledge regarding hazardous weather along their planned route, is critical for safe operation of an aircraft. Presently, weather radar equipped onboard the aircraft is utilized to gather weather data for the flight path ahead. Further, in recent years, a connected radar concept or crowdsourced radar concept has been proposed as the evolution of current weather radar systems. Under the connected radar concept, weather information from various aircraft may be uploaded and downloaded and thus widely shared, increasing the amount and diversity of weather data available to the pilot. Such a system also benefits from the fact that weather information sensed by aircraft weather radar is typically more accurate than ground sensed weather data. One problem with the connected radar concept, however, is the potential additional heavy burden placed on air-ground communication datalinks. Commercial aircraft operations, in particular, are experiencing evolving and increasing utilization of air-ground communication datalinks for air traffic control, airline operations specific applications, and in-flight data services for passengers. Introduction of air-ground uploads and downloads of detailed weather information will only add to the burden of the wireless networks utilized by aircraft.

For the reasons stated above and for other reasons stated below which will become apparent to those skilled in the art upon reading and understanding the specification, there is a need in the art for alternate systems and methods for automatic uplink of weather information to vehicles.

SUMMARY

The embodiments of the present disclosure provide systems and method for automatic uplink of weather information and will be understood by reading and studying the following specification.

In one embodiment, a ground-based system for automatically communicating crowdsourced weather information includes at least one transceiver configured to communicate with a plurality of vehicles via one or more communication links. The system further includes a weather data processing system coupled to the at least one transceiver, the weather data processing system comprising at least one processor coupled to a memory. The at least one processor is configured to: receive weather information from the plurality of vehicles; aggregate the weather information received from the plurality of vehicles and store aggregated weather information in the memory; and automatically transmit aggregated weather information to a first vehicle of the plurality of vehicles via the one or more communication links in response to the weather data processing system receiving a radar error report from the first vehicle.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below include systems and methods for automatic uplink of aggregated weather information to vehicles. In exemplary embodiments, the aggregated weather information is provided by a weather data processing system that receives weather information from a plurality of vehicles. In some embodiments, the weather data processing system automatically uploads the aggregated weather information to a vehicle, triggered by when that vehicle crosses through a selected or predetermined position. In some embodiments, the weather data processing system automatically uploads the aggregated weather information to a vehicle periodically at selected time intervals. In some embodiments, the weather data processing system automatically uploads the aggregated weather information to a vehicle in response to some other trigger event, such as, for example, when a failure of onboard weather radar equipment is detected. Regardless of the specific trigger, automatic uploading of aggregated weather information based on a selected criteria, in the aggregate, may be expected to reduce the amount communications between the vehicle and the weather data processing system compared to a request or on-demand based method. Further, automatically uploading the weather information to the vehicle reduces the burden on the vehicle or crew of the vehicle to request particular weather information during operation.

Figure 1:
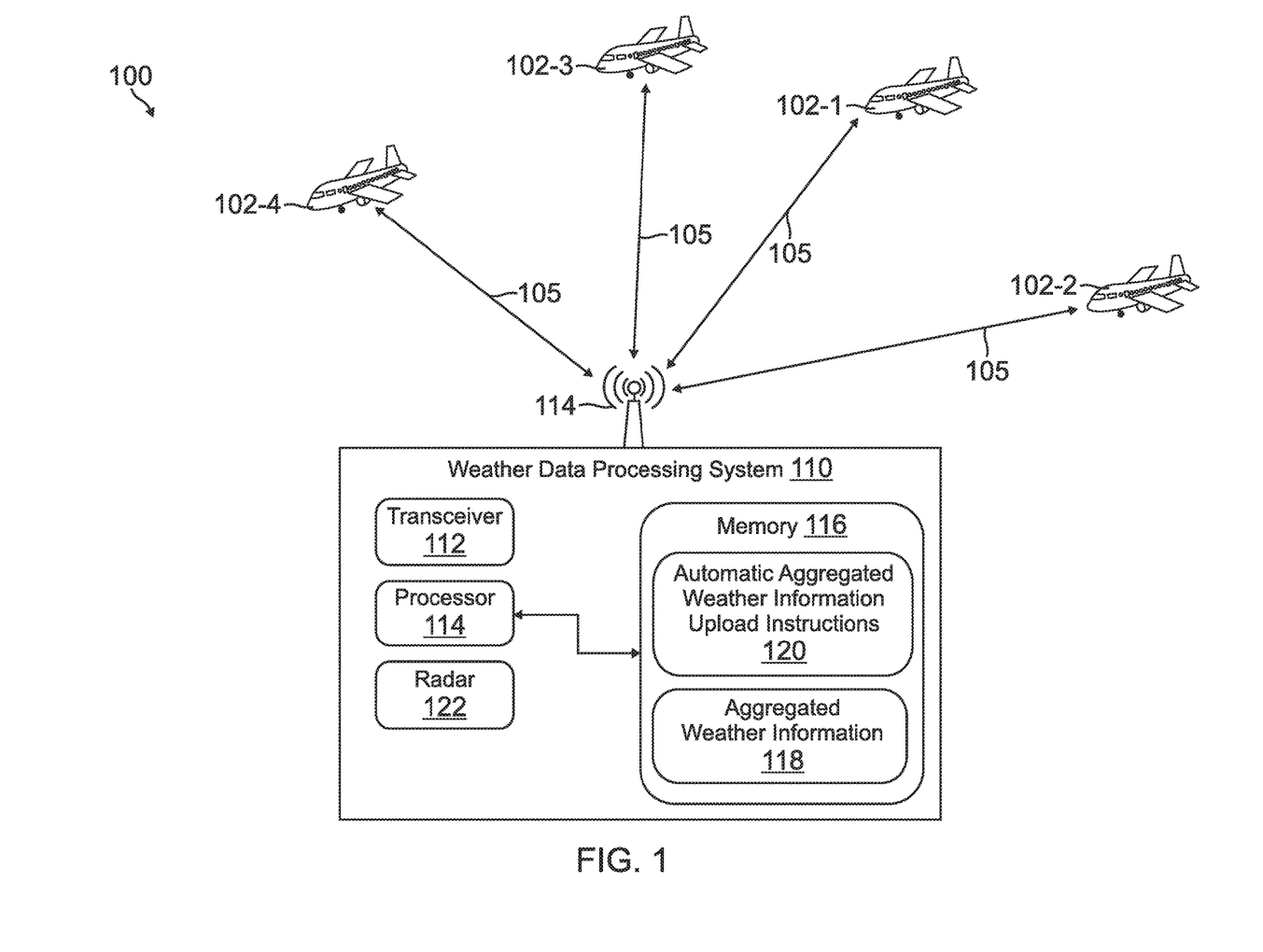
FIG. 1 is a block diagram of an example system according to one embodiment of the present disclosure.

FIG. 1 is a block diagram of an example system 100 for automatic uplink of weather information to vehicles according to one embodiment of the present disclosure. In exemplary embodiments, the system 100 includes vehicles 102 and a weather data processing system 110. While the vehicles 102 in FIG. 1 are depicted as aircraft, it should be understood that this is for illustration purposes and the vehicle can also be other types of vehicles. In exemplary embodiments, the vehicles 102 can be an aircraft, ground-based vehicle, marine vehicle, or the like. This definition of vehicle applies to all embodiments described in the specification. Further, while four vehicles are shown in FIG. 1, it should be understood that this is for illustration purposes and that any desired amount of two or more vehicles may be used to implement the embodiments described herein.

The weather data processing system 110 comprises at least one transceiver 112 coupled to at least one antenna 114, where the at least one transceiver 112 incorporates electronics and other components to establish bidirectional wireless data communication links 105 with the vehicles 102. Such data communication links 105 may include, but are not limited to, received Automatic Dependent Surveillance-Broadcast (ADS-B) messages and weather data, Aircraft Communications Addressing and Reporting System (ACARS) datalinks, satellite communications (SATCOM), cellular communication links, or the like. It should be appreciated that in alternate implementations, the transceiver 112 and the weather data processing system 110 may be located at the same physical ground facility or instead located at some remote distance from each other and connected by a communication link. The weather data processing system 110 comprises at least one processor 114 coupled to a memory 116, which may be used for storing weather information 118 collected from, and shared with, the vehicles. In some embodiments, the weather data processing system 110 further includes a radar 122 configured to obtain ground-based weather information.

In operation, the weather data processing system 110 receives weather information from the vehicles 102 over the data communication links 105. In exemplary embodiments, the weather data processing system 110 combines or aggregates the weather information from the vehicles 102 and stores the weather information from the vehicles 102 as aggregated weather information 118 in memory 116. The at least one processor 114 is configured to execute the automatic aggregated weather information upload instructions 120 to automatically upload the aggregated weather information 118 to a particular vehicle. In exemplary embodiments, the aggregated weather information 118 uploaded to the particular vehicle is customized for the particular vehicle based on a projected path of the first vehicle. In some embodiments, the weather data processing system 110 automatically uploads the aggregated weather information 118 to the particular vehicle based on selected preferences associated with the particular vehicle or fleet operations for the particular vehicle. In some embodiments, the at least one processor 114 is configured to automatically upload customized aggregated weather information when the particular vehicle crosses through a selected geographical position. In some embodiments, the at least one processor 114 is configured to automatically upload customized aggregated weather information to the particular vehicle periodically at selected time intervals. In some embodiments, the at least one processor 114 is configured to automatically upload customized aggregated weather information to a vehicle in response to some other trigger event, such as, for example, when a failure of onboard weather radar equipment is detected. It should be understood that the weather data processing system 110 can upload customized aggregated weather information to any number of vehicles. In exemplary embodiments, the weather data processing system provides the customized aggregated weather information as a subscription based service and the vehicles, or fleet operations for the vehicles, are subscribers to the service.

Figure 2:
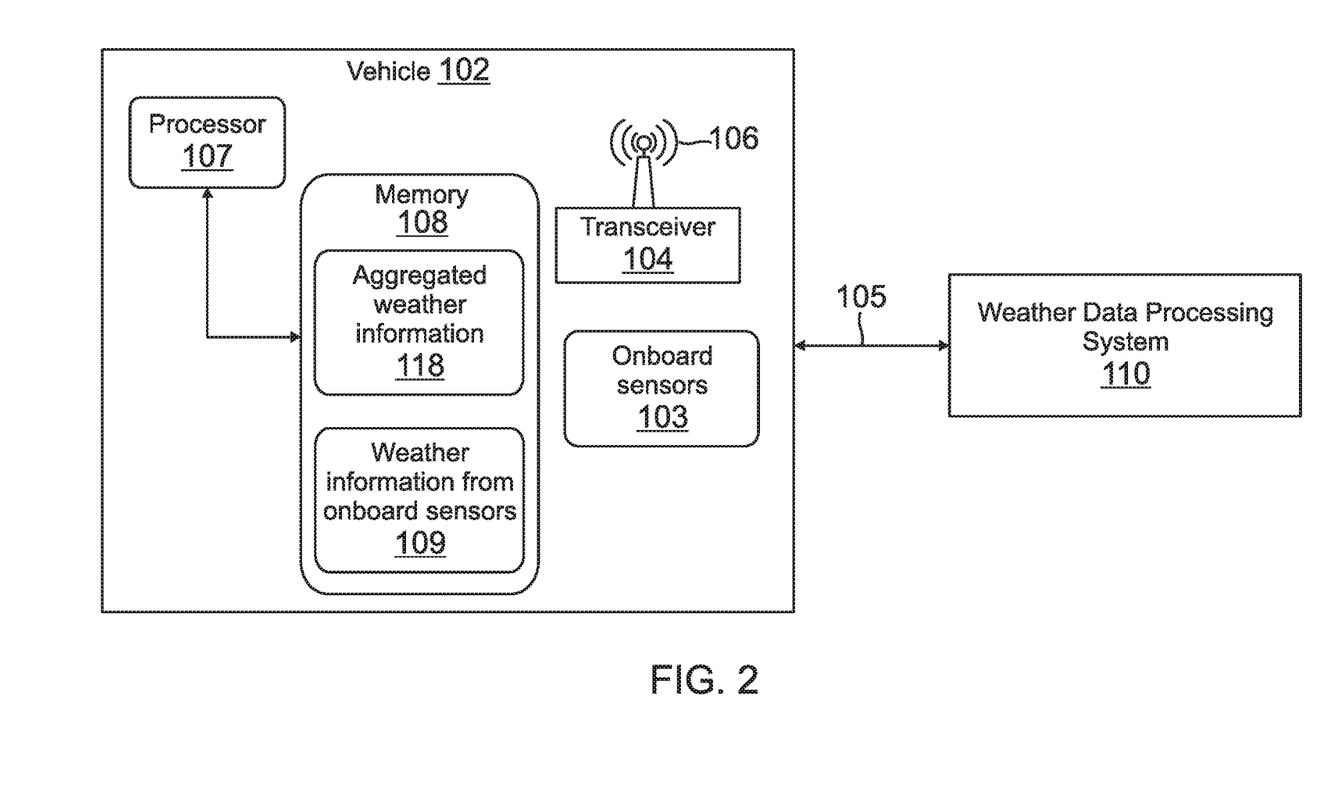
FIG. 2 is a block diagram of an example vehicle according to one embodiment of the present disclosure.

FIG. 2 is a block diagram of an example vehicle 102 according to one embodiment of the present disclosure. The vehicle 102 includes one or more onboard sensors 103, at least one transceiver 104 coupled to an antenna 106, and at least one processor 107 coupled to a memory 108.

The vehicles 102 obtain weather information 109 using the one or more onboard sensors 103. In exemplary embodiments, the one or more onboard sensors 103 comprise a weather radar. The weather information includes, but is not limited to, information regarding lightning, hail, wind shear, turbulence, and compacted volumetric buffer. The vehicles obtain the weather information 109 and communicate the weather information 109 to the weather data processing system 110 for aggregation. In exemplary embodiments, the weather information 109 provided by the vehicles 102 to the weather data processing system 110 is timestamped and/or associated with a position of the vehicle when the information was captured. In such embodiments, the weather data processing system 110 can organize the weather information 109 into a more useful form. For example, the weather information 109 can be aggregated, organized, and offered for delivery as a service by the weather data processing system. In exemplary embodiments, the vehicles 102 may include a clock that is synchronized with other components of the system 100 and a Global Navigation Satellite System (GNSS) sensor to provide the timestamp and position information.

As described herein, weather data processing system 110 automatically uploads the aggregated weather information 118 to vehicles 102 during operation. That is, system 110 monitors specific vehicle related parameters to determine when to transmit customized aggregated weather information 118, as opposed to transmitting that information in response to a manual crew initiated request. When aggregated weather information is needed by the crew of the vehicle, such trigger event based automatic uploading of the aggregated weather information 118 reduces the amount communications between the vehicle 102 and the weather data processing system 110 in circumstances where a request from the vehicle 102 is normally required to obtain the aggregated weather information 118. Further, automatically uploading the aggregated weather information 118 to the vehicle 102 reduces the burden on the vehicle 102 or crew of the vehicle 102 to request particular weather information during operation. Aggregated weather information 118 supplements and may include information that enhances the weather information 109 obtained using the one or more onboard sensors 103. This can increase the accuracy of the weather information considered by the crew of the vehicles 102 and can increase awareness of weather conditions, which can improve safety for the vehicles.

Figure 3:
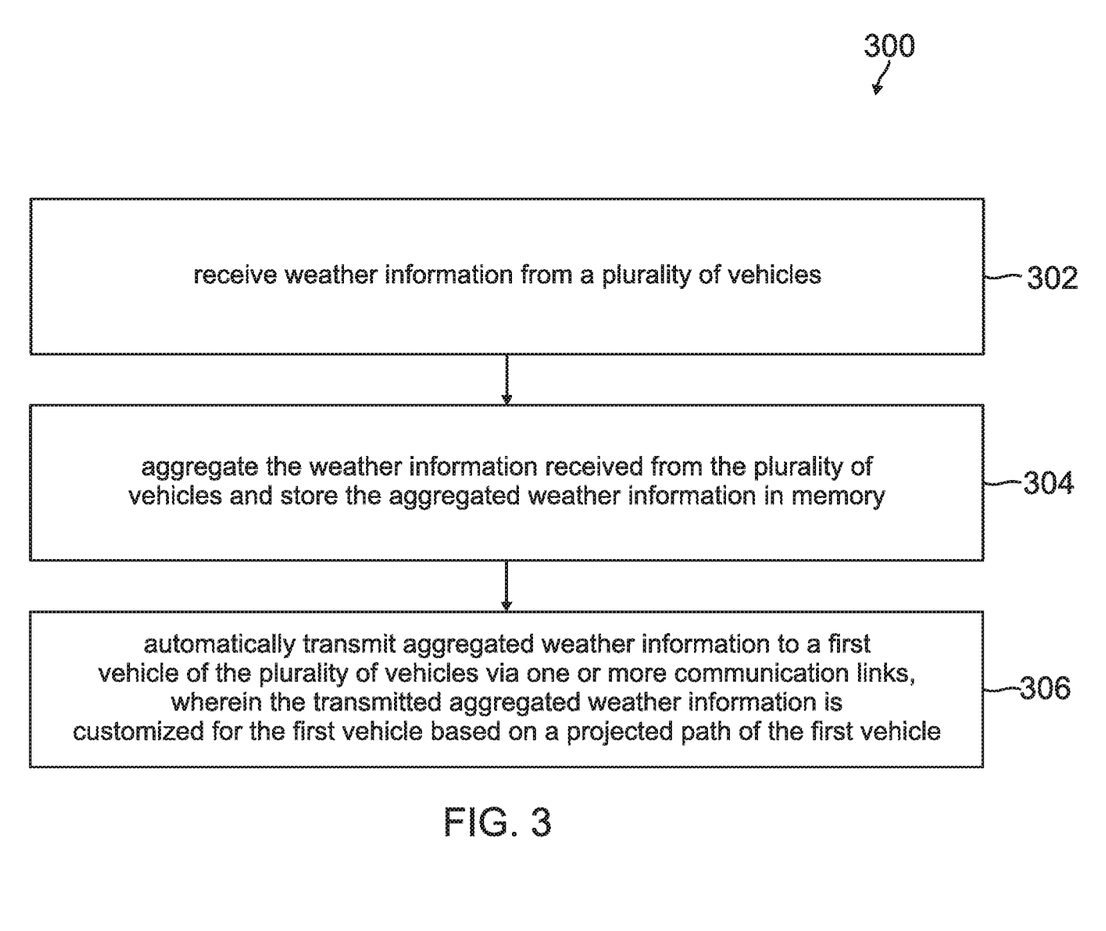
FIG. 3 is a flow chart of an example method for providing aggregated weather information vehicles according to one embodiment of the present disclosure.

FIG. 3 is a flow chart of an example method 300 for providing aggregated weather information to vehicles according to one embodiment of the present disclosure. The functions, structures, and other description of elements for such embodiments described above may apply to like named elements of method 300 and vice versa. In exemplary embodiments, the method 300 is performed by the weather data processing system 110 discussed above with reference to FIGS. 1-2.

The method begins with receiving weather information from a plurality of vehicles (block 302). In exemplary embodiments, the respective weather information provided by each of the plurality of vehicles is obtained using one or more onboard sensors of the respective vehicle. For example, the weather information can include measurements regarding lightning, hail, wind shear, turbulence, compacted volumetric buffer, or other weather information used by vehicles during operation. In exemplary embodiments, the weather information provided by the vehicles is timestamped and/or associated with the geographical location of the vehicle when the weather information was captured. In some embodiments, the weather data processing system requests the weather information from particular vehicles in a geographic region. In other embodiments, the weather data processing system receives weather information from a plurality of vehicles according to a selected or predetermined time interval (for example, every 15 minutes).

The method proceeds with aggregating the weather information received from the plurality of vehicles and storing the aggregated weather information in memory (block 304). In exemplary embodiments, aggregating the weather information received from the plurality of vehicles includes combining the weather information captured by multiple vehicles within the same geographic region. When the area of interest for the onboard sensors of multiple vehicles overlaps, then the weather information provided by those vehicles can be averaged or other techniques known to one having skill in the art.

In exemplary embodiments, the weather information can be organized into geographic region and/or time specific categories. The regions can be predefined or dynamically defined according to real-time situational considerations. For example, if a major weather event is occurring over a particular region, that particular region can be broken up into smaller component regions to increase the granularity and accuracy of the aggregated weather information.

After a certain period of time, the weather information provided by the plurality of vehicles is no longer current or accurate. Accordingly, in some embodiments, the aggregated weather information is deleted from the memory after a timeout period. For example, when the weather information from the plurality of vehicles is timestamped, the weather data processing system can delete aggregated weather information when the aggregated whether information when the time elapsed from when the weather information was captured exceeds a threshold. In exemplary embodiments, the timeout period is less than 30 minutes. It should be understood that other thresholds can be used as well and may be determined based on various factors, such as, for example, the current weather conditions, current distribution of vehicles, etc.

The method proceeds with automatically transmitting the aggregated weather information to a first vehicle of the plurality of vehicles via one or more communication links (block 306). The transmitted aggregated weather information is customized for the first vehicle based on a projected path of the first vehicle. In exemplary embodiments, the transmitted aggregated weather information collected at block 302 is filtered or otherwise processed to remove information not relevant to conditions along the expected or projected path of travel of the vehicle. For example, where the vehicle is an aircraft, the aggregated information automatically transmitted at block 306 would include just the information pertaining to weather affecting a corridor the aircraft is expected to travel through along its expected flight path. In exemplary embodiments, the aggregated weather information is customized for the particular vehicle based on its position, a known travel plan (for example, a flight plan), defined preferences, etc. Particular methods for implementing the automatic uplink of the aggregated weather information based on position, time intervals, and critical triggering events are described below.

Figure 4:
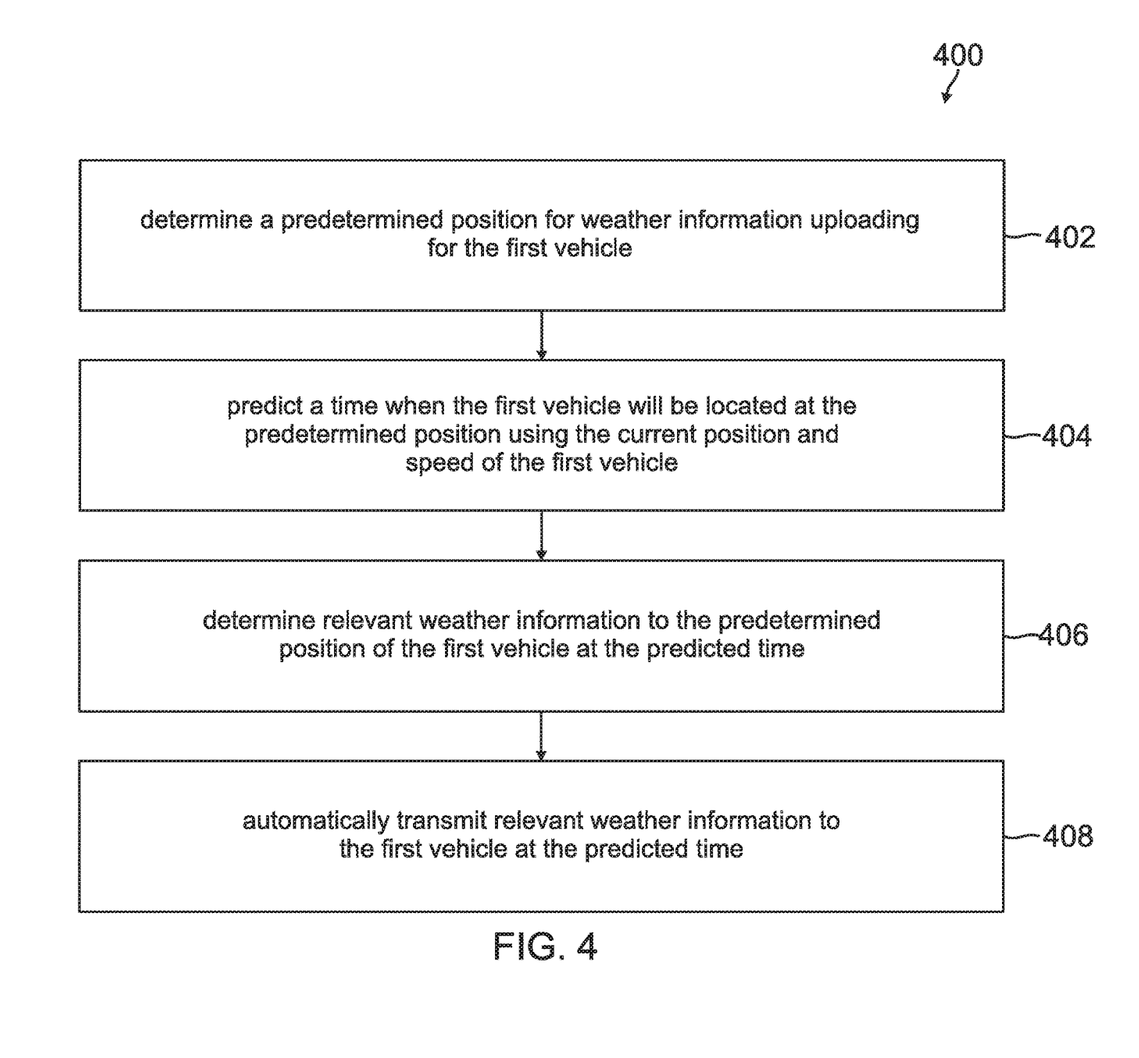
FIG. 4 is a flow chart of an example method for automatic uplink of weather information to vehicles according to one embodiment of the present disclosure.

In some embodiments, it may be beneficial for aggregated weather information to be automatically uploaded by the weather data processing system when the vehicle is at particular positions or geographical locations during operation. FIG. 4 is a flow chart of an example method 400 for automatically transmitting weather information to a vehicle based on position according to one embodiment of the present disclosure. The functions, structures, and other description of elements for such embodiments described above may apply to like named elements of method 400 and vice versa. In exemplary embodiments, the method 400 is performed by the weather data processing system discussed above with reference to FIGS. 1-3.

The method begins with determining a selected position for weather information uploading for the first vehicle (block 402). In exemplary embodiments, individual vehicles or fleet operations for vehicles can provide selected or predetermined positions along a travel path in which aggregated weather information is desired for automatic uplink. For example, a vehicle may selected that weather information be provided by the weather data processing system upon entry into particular geographic regions along a travel path.

The method proceeds with predicting a time when the vehicle will be located at the selected position using the current position and speed of the vehicle (block 404). In exemplary embodiments, the current position and speed of the vehicle are estimated upon receiving an information broadcast message provided by the vehicle, radar, or the like. An information broadcast message could include, for example, an ADS-B message or an automatic identification system (AIS) message. In exemplary embodiments, the time when the vehicle will be located at the selected position can be estimated using the current position and speed of the vehicle in combination with a vector or direction of travel for the vehicle. In some embodiments, a known travel plan for the vehicle, such as a flight path, is provided to the weather data processing system by the vehicle or fleet operations prior to departure and is used in conjunction with the current position and speed of the vehicle to determine the time when the vehicle will be located at the selected position. In such embodiments, the time prediction can be more accurate since the weather data processing system has a more complete set of information regarding the future travel of the vehicle.

The method proceeds with determining relevant weather information to the selected position of the vehicle at the predicted time (block 406). In other words, the weather data processing system customizes the aggregated weather information for transmission to the vehicle at the predicted time. In exemplary embodiments, the weather data processing system determines which geographic region the selected position is contained within and selects aggregated weather information specific for that geographic region for uplink to the vehicle. As discussed above, the weather data processing system can include any level of granularity for the aggregated weather information provided to the vehicle. In exemplary embodiments, aggregated weather information along the particular travel path for the vehicle is also provided. This information can be particularly useful for a vehicle in the event that an alternative route needs to be used to avoid hazardous weather conditions. A vehicle or fleet operations may also request particular settings or preferences for the transmission from the weather data processing system. For example, the vehicle or fleet operations may request particular format, font, communication medium, or the like.

The method proceeds with automatically transmitting the relevant weather information to the vehicle at the predicted time (block 408). In exemplary embodiments, the relevant weather information is transmitted to the vehicle using a wireless data communication link as described above.

Figure 5:
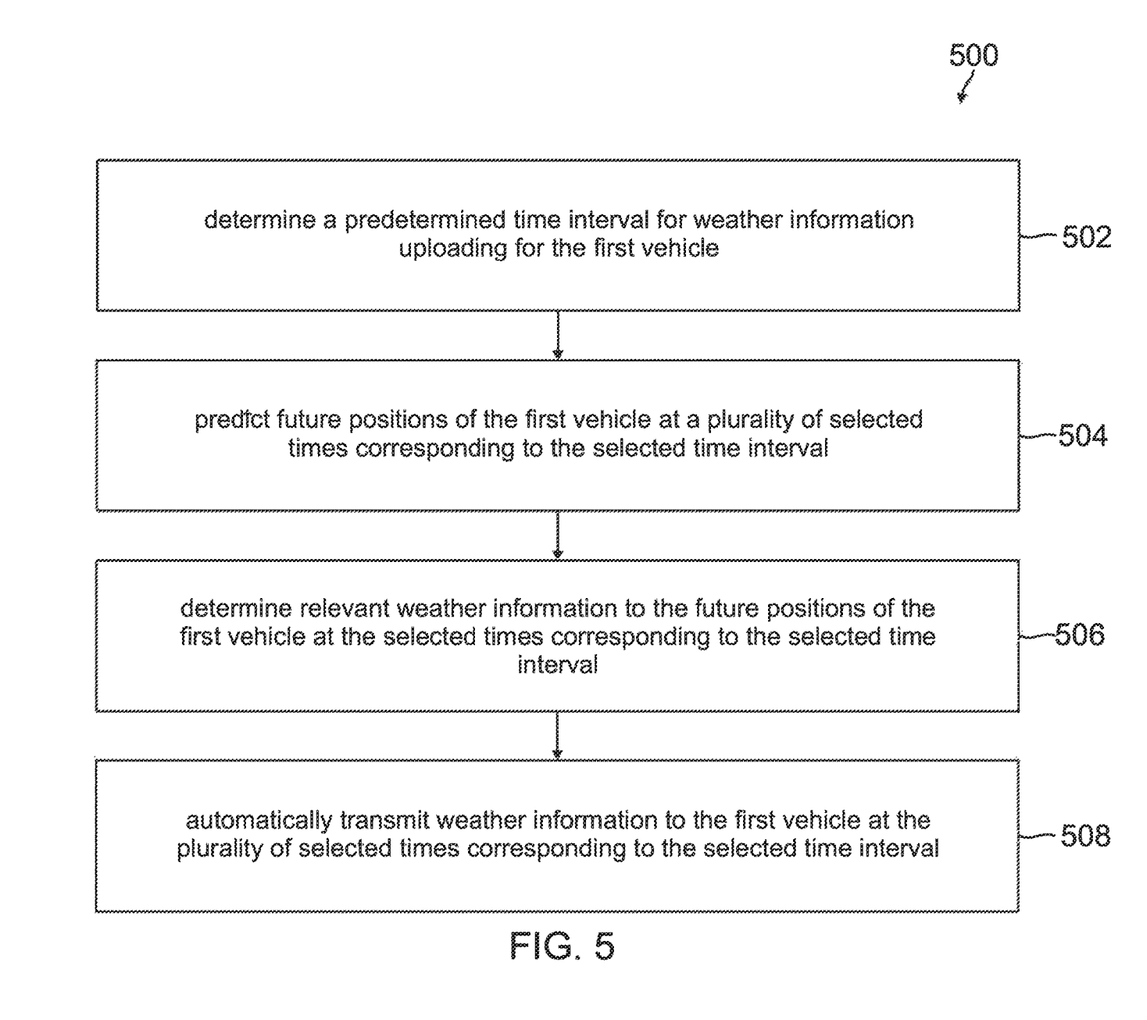
FIG. 5 is a flow chart of an example method for automatic uplink of weather information to vehicles according to one embodiment of the present disclosure.

In some embodiments, it may be beneficial for aggregated weather information to be automatically uploaded to the vehicle by the weather data processing system at specified time intervals during operation of the vehicle. FIG. 5 is a flow chart of an example method 500 for automatically transmitting weather information to a vehicle based on time intervals according to one embodiment of the present disclosure. The functions, structures, and other description of elements for such embodiments described above may apply to like named elements of method 500 and vice versa. In exemplary embodiments, the method 500 is performed by the weather data processing system discussed above with reference to FIGS. 1-4. In some embodiments, the method 500 can be used in conjunction with or as an alternative to the method 400 described above with respect to FIG. 4.

The method begins with determining a selected time interval for weather information uploading for the vehicle (block 502). In exemplary embodiments, individual vehicles or fleet operations for vehicles can provide selected or predetermined time intervals in which aggregated weather information is desired for automatic uplink. In some embodiments, the selected time interval includes evenly spaced time intervals. For example, a vehicle may select that aggregated weather information be provided by the weather data processing system every 15 minutes. In other embodiments, the selected time intervals are non-uniform (i.e., unequal) time intervals that may, or may not, follow a prescribed pattern. For example, the weather data processing system may provide aggregated weather information by alternating between 15 and 30 minute (15-30-15-30) time intervals or any non-uniform time interval desired by the crew of the vehicle or fleet operations for the vehicle. In exemplary embodiments, the non-uniform time intervals can be based on real-time weather patterns, geographic region, or the like. The non-uniform time intervals provide needed flexibility when real-time conditions require shorter time intervals or allow for longer time intervals when travelling through particular regions or weather patterns.

The method proceeds with predicting future positions of the vehicle at a plurality of selected times corresponding to the selected time interval (block 504). In exemplary embodiments, the future positions are predicted using an estimated current position and speed of the vehicle. In exemplary embodiments, the current position and speed of the vehicle are estimated upon receiving an information broadcast message provided by the vehicle, radar, or the like. An information broadcast message could include, for example, an ADS-B message or an automatic identification system (AIS) message. In exemplary embodiments, the future position where the vehicle will be located at the selected time intervals can be estimated using the current position and speed of the vehicle in combination with a vector or direction of travel for the vehicle. In some embodiments, a known travel plan for the vehicle, such as a flight path, is provided to the weather data processing system by the vehicle or fleet operations prior to departure and is used in conjunction with the current position and speed of the vehicle to determine the future position where the vehicle will be located at the selected time interval. In such embodiments, the time prediction can be more accurate since the weather data processing system has a more complete set of information regarding the future travel of the vehicle.

The method proceeds with determining relevant weather information to the future positions of the vehicle at the selected times (block 506). In other words, the weather data processing system customizes the aggregated weather information for transmission to the vehicle. In exemplary embodiments, the weather data processing system determines which geographic region the predicted future positions are contained within and selects aggregated weather information specific for that geographic region for uplink to the vehicle. As discussed above, the weather data processing system can include any desired level of granularity for the aggregated weather information provided to the vehicle. In exemplary embodiments, aggregated weather information along the particular travel path for the vehicle is also provided. This information can be particularly useful for a vehicle in the event that an alternative route needs to be used to avoid hazardous weather conditions. A vehicle or fleet operations may also request particular settings or preferences for the transmission from the weather data processing system. For example, the vehicle or fleet operations may request particular format, font, communication medium, or the like.

The method proceeds with automatically transmitting the weather information to the vehicle at the plurality of selected times corresponding to the selected time interval (block 508). In exemplary embodiments, the relevant weather information is transmitted to the vehicle using a wireless data communication link as described above.

Figure 6:
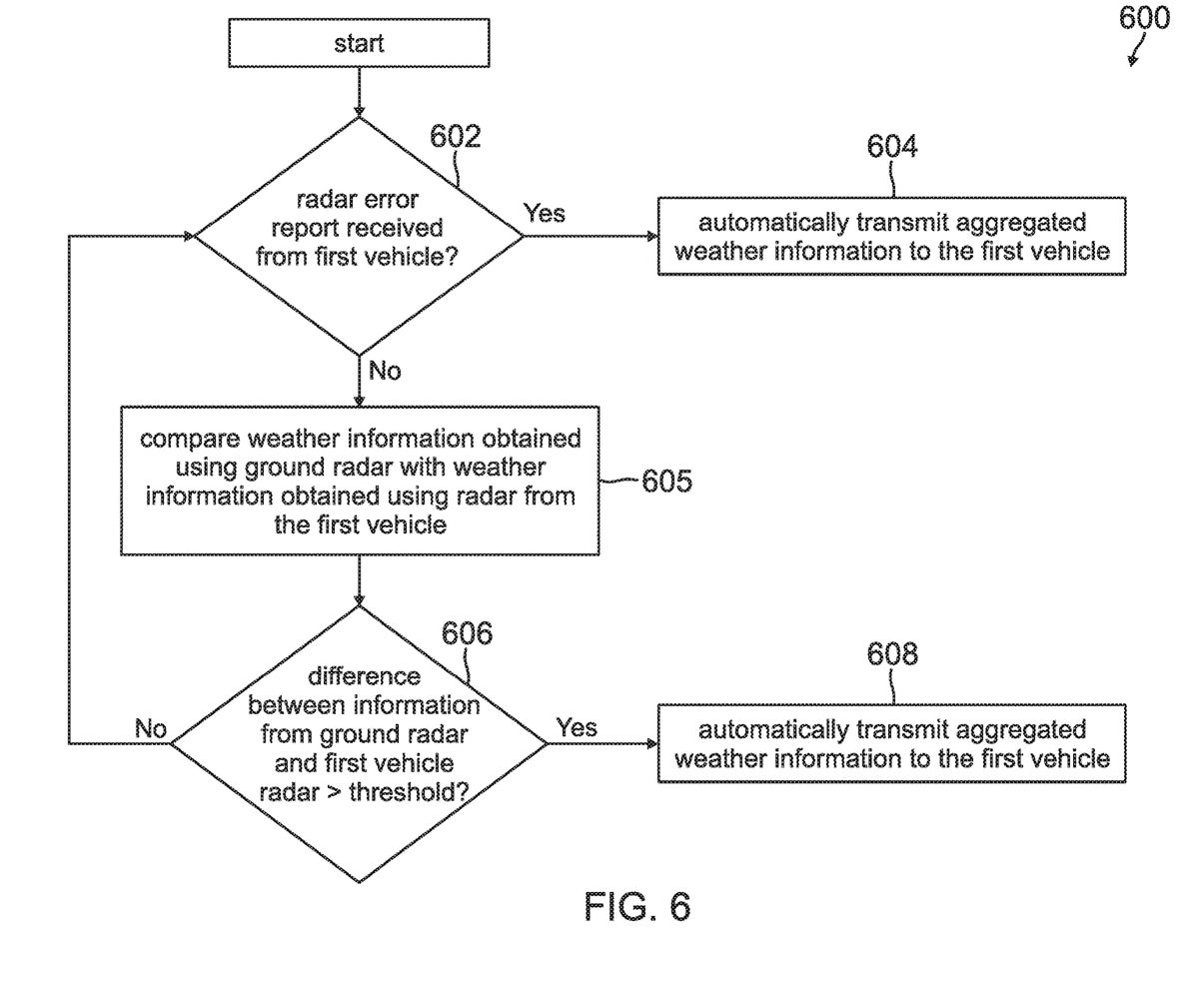
FIG. 6 is a flow chart of an example method for automatic uplink of weather information to vehicles according to one embodiment of the present disclosure.

In some embodiments, it may be beneficial for weather information to be automatically uploaded by the weather data processing system to a vehicle when other critical trigger events occur during operation of the vehicle. A critical trigger event can include, but is not limited to, a failure of the onboard sensors providing weather information to the vehicle or faulty data being provided by the onboard sensors. FIG. 6 is a flow chart of an example method 600 for automatically transmitting weather information to a vehicle according to one embodiment of the present disclosure. The functions, structures, and other description of elements for such embodiments described above may apply to like named elements of method 600 and vice versa. In exemplary embodiments, the method 600 is performed by the weather data processing system discussed above with reference to FIGS. 1-5.

The method 600 begins with determining whether a radar error report has been received from the vehicle (block 602). In exemplary embodiments, a radar error report is sent from the vehicle to the weather data processing system if the vehicle detects that the weather radar onboard the vehicle has failed or is providing faulty data. In other words, the radar error report is generated by the vehicle using resources onboard the vehicle.

When a radar error report has been received, then the method 600 proceeds with automatically transmitting aggregated weather information to the vehicle (block 604). In exemplary embodiments, method 400, 500 for automatic uploading of weather information as described above with respect to FIGS. 4-5 can be used to provide the aggregated weather information to the vehicle upon receipt of a radar error report. In exemplary embodiments, a vehicle or fleet operations may have a predefined preference for proceeding with method 400 or 500 as described above. In some embodiments, the weather data processing system provides a confirmation of receipt of the radar error report in the transmission to the vehicle.

In some situations, a vehicle may not be able to determine when its onboard sensors are providing faulty data. Accordingly, when a radar error report has not been received, then the method 600 proceeds with comparing the weather information obtained by the ground radar (such as, for example, ground radar 122) with the weather information obtained by the vehicle weather radar to determine a difference between the weather information obtained by the ground radar with the weather information obtained by the vehicle weather radar (block 605). In exemplary embodiments, the weather information obtained from the ground radar or the vehicle comprises detected or calculated numerical values or states associated with weather conditions (lightning, hail, wind shear, turbulence, compacted volumetric buffer, etc.). In exemplary embodiments, comparing the weather information includes comparing the numerical values or states associated with a particular weather condition obtained using the ground radar with the numerical values or state associated with the same particular weather condition obtained using the vehicle weather radar. For example, a numerical value associated the wind shear in vicinity of the vehicle can be obtained by both the ground radar and the vehicle weather radar and the comparison would determine the difference between the numerical values. In exemplary embodiments, the comparison may include subtracting the numerical values from one another. In some embodiments, the comparison determines a percentage difference between the numerical values. In another example, a precipitation type (or other detected or calculated state) for an area in the vicinity of the vehicle can be obtained by both the ground radar and the vehicle weather radar and the comparison would determine whether the precipitation types match or not.

The method 600 proceeds with determining whether the difference between the weather information obtained by the ground radar and the weather information obtained by the vehicle weather radar exceeds a threshold (block 606). In exemplary embodiments, the threshold may correspond to numerical value, a percentage, a tolerable degree of difference between detected states of weather conditions (for example, precipitation types), or the like. The threshold may be selected using a desired accuracy level determined by the vehicle or fleet operations, a safety regulation, or other factors known to one having skill in the art. For example, a difference (calculated by subtraction) between detected values associated the wind shear in vicinity of the vehicle obtained by the ground radar and the vehicle weather radar (obtained during step 605) would be compared to a threshold value. In another example, a difference between detected states of a weather condition can be determined and compared to a tolerable degree of difference. For example, a difference between detected precipitation types of sleet and snow could be tolerable, but a difference between rain and hail would not be tolerable.

When the difference between the ground radar and the vehicle weather radar is not above the threshold, the method proceeds back to step 602. When the difference between the ground radar and the vehicle weather radar is above a threshold, then the method 600 proceeds with automatically transmitting aggregated weather information to the vehicle (block 608). In exemplary embodiments, the automatic transmission of aggregated weather information is similar to that described above with respect to block 604. In some embodiments, an indication that a difference between the weather information provided by the ground radar and the weather information provided by the vehicle is included in the transmission to the vehicle. The vehicle may use such information to initiate a self-diagnostic process for its onboard sensors. In some embodiments, the weather data processing system may also provide a message to fleet operations regarding the difference.

While method 600 is shown as an ordered combination, it should be understood that steps 602 and 606 described above may also be performed in parallel if desired. In such embodiments, the weather data processing system may optionally include a mechanism for determining whether an automatic transmission of aggregated weather information has been made to a particular vehicle within a timeout period upon an affirmative determination in steps 602 or 606. Such a mechanism would prevent repeated transmissions upon independent determinations that an automatic transmission of aggregated weather information to the particular vehicle is made.

In exemplary embodiments, some of the vehicles 102 in the vicinity of the weather data processing system 110 may not subscribe to the automatic weather information uplink services provided by the weather data processing system 110 and/or configured to provide weather information to the weather data processing system 110. Such vehicles 102, which may belong to a particular fleet, may still obtain aggregated weather information 118 from the weather data processing system 110 using a request or on-demand based methods. Such methods could include a request sent from the vehicle 102 to the weather data processing system 110, where the request includes the time and position of the vehicle for the particular transmission.

The weather data processing system 110 includes or functions with software programs, firmware or other computer readable instructions (such as, for example, automatic aggregated weather information uploading instructions 120) for carrying out various methods, process tasks, calculations, and control functions, used in the automatic uplink of weather information to vehicles. In various alternative embodiments, system elements, method steps, or examples described throughout this disclosure (such as the weather data processing system 110 or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. Therefore other embodiments of the present disclosure may include such hardware as well as elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Example Embodiments

Example 1 includes a ground-based system for automatically communicating crowdsourced weather information, comprising: at least one transceiver configured to communicate with a plurality of vehicles via one or more communication links; a weather data processing system coupled to the at least one transceiver, the weather data processing system comprising at least one processor coupled to a memory, wherein the at least one processor is configured to: receive weather information from the plurality of vehicles; aggregate the weather information received from the plurality of vehicles and store the aggregated weather information in the memory; and automatically transmit aggregated weather information to a first vehicle of the plurality of vehicles via the one or more communication links in response to the weather data processing system receiving a radar error report from the first vehicle.

Example 2 includes the ground-based system of Example 1, wherein the transmitted aggregated weather information is customized for the first vehicle based on a projected path of the first vehicle Example 3 includes the ground-based system of any of Examples 1-2, wherein the at least one processor is configured to automatically transmit aggregated weather information to the first vehicle at selected time intervals.

Example 4 includes the ground-based system of Example 3, wherein the at least one processor is configured to automatically transmit aggregated weather information to the first vehicle at a plurality of selected times corresponding to the selected time intervals; wherein the at least one processor is further configured to: determine the selected time intervals for aggregated weather information uploading for the first vehicle; predict future positions of the first vehicle at a plurality of selected times corresponding to the selected time intervals; and determine relevant aggregated weather information for the future positions of the first vehicle at the plurality of selected times corresponding to the selected time intervals.

Example 5 includes the ground-based system of Example 4, wherein the at least one processor is configured to predict future positions of the first vehicle at the plurality of selected times corresponding to the selected time intervals based on at least one of: an estimated current position of the first vehicle; an estimated current speed of the first vehicle; a known travel plan of the first vehicle; or a known direction of travel of the first vehicle.

Example 6 includes the ground-based system of Example 5, wherein the at least one processor is configured to customize the aggregated weather information for the first vehicle based on at least one of: a geographic region of at least one of the future positions of the first vehicle at the selected times; a known travel plan of the first vehicle; or preferences for communication of the first vehicle.

Example 7 includes the ground-based system of any of Examples 1-6, wherein the ground-based system further comprises a radar configured to provide ground-based weather information; wherein the at least one processor is further configured to: compare weather information from the first vehicle and the ground-based weather information from the radar to determine a difference between the weather information from the first vehicle and the ground-based weather information from the radar; and determine whether the difference between weather information from the first vehicle and the ground-based weather information from the radar exceeds a selected threshold, wherein the aggregated weather information is automatically transmitted to the first vehicle when the discrepancy between weather information from the first vehicle and the ground-based weather information from the radar exceeds the selected threshold.

Example 8 includes the ground-based system of any of Examples 1-7, wherein the at least one transceiver is further configured to communicate with a second plurality of vehicles via one or more communication links, wherein the second plurality of vehicles is configured to request aggregated weather information instead of receiving an automatic transmission of aggregated weather information.

Example 9 includes a ground-based system for automatically communicating crowdsourced weather information, comprising: at least one transceiver configured to communicate with a plurality of vehicles via one or more communication links; a weather data processing system coupled to the at least one transceiver, the weather data processing system comprising at least one processor coupled to a memory, wherein the at least one processor is configured to: receive weather information from the plurality of vehicles; aggregate the weather information received from the plurality of vehicles and store the aggregated weather information in the memory; and automatically transmit aggregated weather information to a first vehicle of the plurality of vehicles via the one or more communication links, wherein the transmitted aggregated weather information is customized for the first vehicle based on a projected path of the first vehicle, wherein the aggregated weather information is automatically transmitted to the first vehicle at non-uniform time intervals.

Example 10 includes the ground-based system of Example 9, wherein the at least one processor is configured to automatically transmit the aggregated weather information to the first vehicle at a plurality of selected times corresponding to the non-uniform time intervals; wherein the at least one processor is further configured to: predict future positions of the first vehicle at the plurality of selected times corresponding to the non-uniform time intervals; and determine relevant aggregated weather information for the future positions of the first vehicle at the plurality of selected times corresponding to the non-uniform time intervals.

Example 11 includes the ground-based system of Example 10, wherein the at least one processor is configured to predict future positions of the first vehicle at the plurality of selected times corresponding to the unequal time intervals is based on an estimated current position of the first vehicle and an estimated current speed of the first vehicle.

Example 12 includes the ground-based system of Example 11, wherein the at least one processor is configured to predict future positions of the first vehicle at the plurality of selected times corresponding to the unequal time intervals is further based on a known travel plan of the first vehicle or a known direction of travel of the first vehicle.

Example 13 includes the ground-based system of any of Examples 9-12, wherein the ground-based system further comprises a radar configured to provide ground-based weather information; wherein the at least one processor is further configured to: compare weather information from the first vehicle and the ground-based weather information from the radar to determine a difference between the weather information from the first vehicle and the ground-based weather information from the radar; and determine whether the difference between weather information from the first vehicle and the ground-based weather information from the radar exceeds a selected threshold, wherein the aggregated weather information is automatically transmitted to the first vehicle when the discrepancy between weather information from the first vehicle and the ground-based weather information from the radar exceeds the selected threshold.

Example 14 includes the ground-based system of any of Examples 9-13, wherein the at least one processor is further configured to determine whether a radar error report from the first vehicle has been received by the weather data processing system, wherein the aggregated weather information is automatically transmitted to the first vehicle using unequal time intervals when the weather data processing system has received a radar error report from the first vehicle.

Example 15 includes a ground-based system for automatically communicating crowdsourced weather information, comprising: at least one transceiver configured to communicate with a plurality of vehicles via one or more communication links; a radar configured to provide ground-based weather information; a weather data processing system coupled to the at least one transceiver, the weather data processing system comprising at least one processor coupled to a memory, wherein the at least one processor is configured to: receive weather information from the plurality of vehicles; aggregate the weather information received from the plurality of vehicles and store the aggregated weather information in the memory; compare the weather information from the first vehicle and the ground-based weather information from the radar to determine a difference between the weather information from the first vehicle and the ground-based weather information from the radar; and automatically transmit aggregated weather information to a first vehicle of the plurality of vehicles via the one or more communication links in response to the difference between weather information from the first vehicle and the ground-based weather information from the radar exceeding a selected threshold.

Example 16 includes the ground-based system of Example 15, wherein the transmitted aggregated weather information is customized for the first vehicle based on a projected path of the first vehicle.

Example 17 includes the ground-based system of any of Examples 15-16, wherein the at least one processor is configured to automatically transmit aggregated weather information to a first vehicle of the plurality of vehicles at selected time intervals, wherein the at least one processor is configured to automatically transmit the aggregated weather information to the first vehicle at the plurality of selected times corresponding to the selected time intervals; wherein the at least one processor is further configured to: determine the selected time intervals for aggregated weather information uploading for the first vehicle; predict future positions of the first vehicle at a plurality of selected times corresponding to the selected time intervals; and determine relevant aggregated weather information for the future positions of the first vehicle at the plurality of selected times corresponding to the selected time intervals.

Example 18 includes the ground-based system of Example 17, wherein the at least one processor is configured to predict future positions of the first vehicle at the plurality of selected times corresponding to the selected time intervals based on an estimated current position of the first vehicle and an estimated current speed of the first vehicle.

Example 19 includes the ground-based system of Example 18, wherein the at least one processor is further configured to predict future positions of the first vehicle at the plurality of selected times corresponding to the selected time intervals based on a known travel plan of the first vehicle or a known direction of travel of the first vehicle.

Example 20 includes the ground-based system of any of Examples 15-19, wherein the at least one processor is further configured to determine whether a radar error report from the first vehicle has been received by the weather data processing system, wherein the aggregated weather information is automatically transmitted to the first vehicle when the weather data processing system has received a radar error report from the first vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A ground-based system for automatically communicating crowdsourced weather information, comprising:
   at least one transceiver configured to communicate with a plurality of vehicles via one or more communication links;
   a weather data processing system coupled to the at least one transceiver, the weather data processing system comprising at least one processor coupled to a memory, wherein the at least one processor is configured to:
      receive weather information from the plurality of vehicles;
      aggregate the weather information received from the plurality of vehicles and store the aggregated weather information in the memory; and
      automatically transmit aggregated weather information to a first vehicle of the plurality of vehicles via the one or more communication links in response to the weather data processing system receiving a radar error report from the first vehicle.

2. The ground-based system of claim 1, wherein the transmitted aggregated weather information is customized for the first vehicle based on a projected path of the first vehicle.

3. The ground-based system of claim 1, wherein the at least one processor is configured to automatically transmit aggregated weather information to the first vehicle at selected time intervals.

4. The ground-based system of claim 3, wherein the at least one processor is configured to automatically transmit aggregated weather information to the first vehicle at a plurality of selected times corresponding to the selected time intervals;
   wherein the at least one processor is further configured to:
      determine the selected time intervals for aggregated weather information uploading for the first vehicle;
      predict future positions of the first vehicle at a plurality of selected times corresponding to the selected time intervals; and
      determine relevant aggregated weather information for the future positions of the first vehicle at the plurality of selected times corresponding to the selected time intervals.

5. The ground-based system of claim 4, wherein the at least one processor is configured to predict future positions of the first vehicle at the plurality of selected times corresponding to the selected time intervals based on at least one of:
   an estimated current position of the first vehicle;
   an estimated current speed of the first vehicle;
   a known travel plan of the first vehicle; or
   a known direction of travel of the first vehicle.

6. The ground-based system of claim 5, wherein the at least one processor is configured to customize the aggregated weather information for the first vehicle based on at least one of:
   a geographic region of at least one of the future positions of the first vehicle at the selected times;
   a known travel plan of the first vehicle; or
   preferences for communication of the first vehicle.

7. The ground-based system of claim 1, wherein the ground-based system further comprises a radar configured to provide ground-based weather information;
- wherein the at least one processor is further configured to:
- compare weather information from the first vehicle and the ground-based weather information from the radar to determine a difference between the weather information from the first vehicle and the ground-based weather information from the radar; and
- determine whether the difference between weather information from the first vehicle and the ground-based weather information from the radar exceeds a selected threshold, wherein the aggregated weather information is automatically transmitted to the first vehicle when the discrepancy between weather information from the first vehicle and the ground-based weather information from the radar exceeds the selected threshold.

8. The ground-based system of claim 1, wherein the at least one transceiver is further configured to communicate with a second plurality of vehicles via one or more communication links, wherein the second plurality of vehicles is configured to request aggregated weather information instead of receiving an automatic transmission of aggregated weather information.

9. A ground-based system for automatically communicating crowdsourced weather information, comprising:
- at least one transceiver configured to communicate with a plurality of vehicles via one or more communication links;
- a weather data processing system coupled to the at least one transceiver, the weather data processing system comprising at least one processor coupled to a memory, wherein the at least one processor is configured to:
- receive weather information from the plurality of vehicles;
- aggregate the weather information received from the plurality of vehicles and store the aggregated weather information in the memory;
- predict future positions of a first vehicle of the plurality of vehicles at a plurality of selected times corresponding to non-uniform time intervals;
- determine relevant aggregated weather information for the future positions of the first vehicle at the plurality of selected times corresponding to the non-uniform time intervals; and
- automatically transmit the relevant aggregated weather information to the first vehicle via the one or more communication links at the plurality of selected times corresponding to the non-uniform time intervals.

10. The ground-based system of claim 9, wherein the at least one processor is configured to predict future positions of the first vehicle at the plurality of selected times corresponding to the non-uniform time intervals based on an estimated current position of the first vehicle and an estimated current speed of the first vehicle.

11. The ground-based system of claim 10, wherein the at least one processor is configured to predict future positions of the first vehicle at the plurality of selected times corresponding to the non-uniform time intervals further based on a known travel plan of the first vehicle or a known direction of travel of the first vehicle.

12. The ground-based system of claim 9, wherein the ground-based system further comprises a radar configured to provide ground-based weather information;
- wherein the at least one processor is further configured to:
- compare weather information from the first vehicle and the ground-based weather information from the radar to determine a difference between the weather information from the first vehicle and the ground-based weather information from the radar; and
- determine whether the difference between weather information from the first vehicle and the ground-based weather information from the radar exceeds a selected threshold, wherein the aggregated weather information is automatically transmitted to the first vehicle when the discrepancy between weather information from the first vehicle and the ground-based weather information from the radar exceeds the selected threshold.

13. The ground-based system of claim 9, wherein the at least one processor is further configured to determine whether a radar error report from the first vehicle has been received by the weather data processing system, wherein the aggregated weather information is automatically transmitted to the first vehicle using non-uniform time intervals when the weather data processing system has received a radar error report from the first vehicle.

\* \* \* \* \*